3,360,495
POLYURETHANES
Erwin Muller and Dieter Dietrich, Leverkusen, Germany, assignors to Farbenfabriken Bayer Aktiengesellschaft, Leverkusen, Germany, a German corporation
No Drawing. Filed Feb. 6, 1964, Ser. No. 343,104
Claims priority, application Germany, Feb. 11, 1963, F 38,979
4 Claims. (Cl. 260—33.2)

The present invention relates to a process for the preparation of polyurethane polyaddition products, and more particularly, to a method of preparation of stable dispersion thereof.

It has been known heretofore to prepare polyurethanes from organic polyisocyanates and glycols having two primary hydroxyl groups to form polyaddition products; and, if suitable initial reactants are chosen, high molecular weight, high melting, linear and in some cases, fiber-forming polyurethane products are obtained.

Such reactions for the preparation of polyurethanes are usually carried out in the molten state or in solvents inert with respect to the reactants. These solvents which must be anhydrous in addition to being inert, are cumbersome and expensive in practical applications, and require that the polyaddition product of the reaction undergo extensive purification procedures to insure the complete separation of the desired end product from the solvent in which it was fabricated. Therefore, the end product must usually be separated out, washed, filtered and dried. Should a stable dispersion of the polyurethane be desired, such a product would necessarily suffer the disadvantage of incorporating therein some of the undesirable solvent which may easily impair the properties of the product in which the emulsion is employed unless extensive purification procedures involving the steps outlined above are employed.

It is, therefore, an object of this invention to provide a method for the preparation of a polyurethane which is devoid of all the foregoing disadvantages. Another object of this invention is to provide a method for producing a stable dispersion of the polyurethane in a solvent which need not be separated therefrom prior to the use of the polyurethane as a thickening agent. Yet another object is to provide a medium for the polyaddition reaction which yields a polyurethane product in the form of a dispersion compatible with textiles and dyestuffs and adapted to be used as auxiliary agents therefor. Still another object of this invention is the production of a stable dispersion of a polyurethane which can be used as a modifier of dyestuffs and auxiliary textile agents without filtering, washing, and drying the product before a dispersion thereof may be prepared.

These and other objects which may become apparent from the following description are accomplished in accordance with this invention, generally speaking, by providing a method for the preparation of a stable dispersion of a polyurethane in a high molecular weight polyhydric alcohol having substantially exclusively secondary hydroxyl groups which involves reacting up to stoichiometric equivalent amounts of an organic diisocyanate and a glycol having two primary hydroxyl groups while the two reactants are mixed together with the high molecular weight polyhydric alcohol. The polyhydric alcohol is used as the solvent in the reaction and must be liquid at the reaction temperature.

Any suitable polyhydroxyl compound having substantially exclusively secondary alcoholic hydroxyl groups may be used in accordance with this invention as the inert solvent. Because of the different reactivity between the hydrogen atoms of the primary hydroxyl groups and the diisocyanate, and the hydrogen atoms of the secondary hydroxyl groups and the diisocyanate, it has been found that a preferential reaction between the hydrogen atoms on the primary hydroxyl groups and the isocyanato groups occurs with such a sharp differentiation that a stable dispersion of a polyurethane in a polyhydric alcohol, for example, can be prepared without substantial reaction of the active hydrogen atoms of the solvent with the diisocyanate, provided that substantially stoichiometric equivalents or less of the isocyanato groups per equivalents of the reactive hydrogen atoms of the primary hydroxyl groups are mixed together.

It has been found that the polyurethane product which results from the preferential reaction between the organic diisocyanate and the primary dihydric alcohol is produced in a finely divided form in the polyhydric alcohol containing substantially exclusively secondary hydroxyl groups, and the distribution of the polyurethane resulting from this reaction is so fine that no sedimentation occurs even after prolonged standing.

Any suitable dihydric primary alcohol may be used in the practice of this invention such as, for example, ethylene glycol, diethylene glycol, triethylene glycol, 1,4-butanediol, 1,6-hexanediol, thiodiglycol, di-β-hydroxyethylsulphone, neopentylglycol, N-methyl-diethanolamine, N-cyclohexyl-dihydroxy-ethylamine, dihydroxyethyl piperazine, dihydroxyethyl-aniline, hydroquinone-β-dihydroxyethylether, terephthalic acid diglycol ester, 4,4'-β-dihydroxyethylether of diphenyl-dimethyl-methane or pentachlorophenyl-dihydroxyethyl urea. Any suitable organic diisocyanate may be used including aliphatic and aromatic diisocyanates. Examples of suitable organic diisocyanates including the heterocyclic organic diisocyanates are 1,6-hexamethylene diisocyanate, 1,4-butylene diisocyanate, furfurylidene diisocyanate and the preferred aromatic polyisocyanates including 2,4-toluylene diisocyanate, 2,6-toluylene diisocyanate and mixtures thereof, preferably a mixture of about 80 percent 2,4- and 20 percent 2,6-toluylene diisocyanate, 4,4'-diphenylmethane diisocyanate, 4,4'-diphenyl-3,3'-dimethyl methane diisocyanate, 1,5-naphthalene diisocyanate, 1-methyl-2,4-diisocyanato-5-chlorobenzene, 2,4-diisocyanato-s-triazine, 1-methyl-2,4-diisocyanato cyclohexane, p-phenyl diisocyanate, 1,4-naphthalene diisocyanate.

Any suitable organic compound containing at least two almost exclusively secondary alcoholic groups as determined by the Zerewitinoff method, and which is liquid at the reaction temperature may be used as the solvent in this invention. These compounds may be linear or branched and should generally have a molecular weight of abot 500 to about 3500. Examples of suitable types of organic compounds containing at least two active secondary hydrogen containing groups are hydroxyl polyesters, polyhydric polyalkylene ethers, polyhydric polythioethers, polyacetals, aliphatic polyols, including alkane, alkene and alkyne diols, triols, tetrols the like.

The high molecular weight organic compound containing at least two active hydrogen containing groups which are almost exclusively secondary hydroxyl groups may vary over a wide range. Preferably, however, a molecular weight of at least about 500 and preferably between about 500 and about 3500 with an hydroxyl number within the range of from about 25 to about 225 and acid number, where applicable, below about 5 is most advantageous. A satisfactory upper limit for the molecular weight of the organic compound containing at least two active hydrogen containing groups is about 10,000 but this limitation may vary so long as satisfactory mixing of the organic compound containing at least two active hydrogen containing groups with the dihydric primary alcohol and the organic diisocyanate can be obtained.

Any suitable hydroxyl polyester having almost exclusively secondary hydroxyl groups may be used such as, for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, 1,2-butylene glycol, 1,2-propylene glycol, 1,3-butylene glycol, 1,4-pentanediol, 1,3-pentanediol, glycerine, trimethylol-propane, 1,3,6-hexane triol, sorbitol and the like.

Any suitable polyhydric polyalkylene ether having substantially exclusively secondary hydroxyl groups may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight. It is preferred that the initiator have from 2 to 8 active sites to which the alkylene oxides may add, such as, for example, alcohols and the like. Any suitable alkylene oxide may be used such as, for example, propylene oxide, butylene oxide, amylene oxide, epihalohydrins such as epichlorohydrin, styrene oxide and the like. Any suitable initiator may be used including, for example, water or polyhydric alcohols, preferably having 2 to 8 hydroxyl groups. Phosphorous acids may also be used, but the phosphorous compounds are somewhat peculiar in that a different mode of preparation may be required, as more particularly set forth below. It is preferred to use alkylene oxides which contain from 3 to 5 carbon atoms, and generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of some suitable initiators are water, ethylene glycol, propylene glycol, glycerine, trimethylol propane, pentaerythritol, arbitol, sorbitol, maltose, sucrose, and the like. The phosphorous containing polyols are more fully described below.

Any suitable polyhydric polythioether may be used such as, for example, the reaction product of a polyhydric alcohol such as is disclosed above for the preparation of the hydroxyl polyesters with any other suitable thioether-glycols. Other suitable polyhydric polythioethers are disclosed in U.S. Patents 2,862,972 and 2,900,368.

Any suitable polyacetal having almost exclusively secondary hydroxyl groups may be used, such as, for example, the reaction product formaldehyde or other suitable aldehyde with a polyhydric alcohol such as those disclosed above for use in the preparation of the hydroxyl polyesters.

Phosphorus containing compounds are often advantageously used because of the flame retarding effect which they impart to the resulting dispersion. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantogeously prepared in accordance with the method of U.S. Patent 3,009,929 where triphenyl phosphite, for example, is reacted with a polypropylene ether glycol to prepare a product having a molecular weight of about 500. Other processes are disclosed in the patent.

Any of the compounds of any of the classes set forth above may be substituted with halogen such as, for example, chloro, bromo, iodo and the like; alkoxy such as, for example, methoxy, ethoxy, propoxy, butoxy and the like; carboalkoxy such as, for example, carbomethoxy, carboethoxy and the like; mercapto, carbonyl, thiocarbonyl, phosphoryl, phosphato and the like.

It is desirable to use a catalyst. Any suitable catalyst may be used.

Any suitable tin compound may be used including, for example, stannous chloride or an organic tin compound. It is preferred to use the organic tin compounds such as the stannous salts of carboxylic acids, including stannous oleate, stannous octoate, stannous stearate and the like. But one may also use tetravalent tin compounds including for example, dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired one may use, for example, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

In the preferred embodiment of this invention, the dihydric primary alcohol is first mixed at room temperature in a polypropylene glycol ether containing substantially exclusively secondary hydroxyl groups and having a molecular weight of at least about 500 and an hydroxyl number of about 56. An amount of toluylene diisocyanate is added wherein the number of isocyanato groups is only stoichiometrically equivalent to the number of hydrogen atoms of the primary hydroxyl groups of the primary dihydric alcohol, which are more reactive with NCO groups than the hydrogen atoms of the secondary hydroxyl groups of the polyhydric polyether used as the solvent. The reaction mixture is stirred vigorously and an exothermic reaction takes place. The polyurethane settles out after a few minutes and stirring is continued while heat is applied for one hour so that the reaction temperature reaches about 80° to 120° C. and preferably about 120° C. A stable dispersion is obtained which has a hydroxyl number generally between about 50 and about 60.

Where the reaction product required necessitates the use of reactants or solvent which are not liquid at room temperature, the components may be heated to their liquid state and the process of this invention may then be carried out. For example, the reaction may be begun at a temperature of 80° C. which temperature may thereafter be raised to about 120° C. if desired. In any case, the maximum temperature of the reaction mixture should never exceed about 150° C. and it is preferred to carry out the reaction at temperatures increased to only between about 80° C. and 120° C.

The quantity of the initial reactants to be used depends on the desired viscosity of the dispersion product and the proportions of the initial reactants depends on the desired molecular weight of the polyurethane product. Generally, the overall quantity of the initial reactants is chosen so that the final product has a solids content of between about 5 to 40%. It is demonstrated in the process of this invention that even small quantities of the polyurethane reaction product formed in the high molecular weight polyhydroxyl compound containing exclusively secondary hydroxyl groups cause a considerable increase in the viscosity of the polyhydroxyl compound, so that a stable dispersion of significant viscosity may be readily obtained even in the instance that as small an amount of the polyurethane in the polyhydroxyl compound as 5% is obtained.

The molecular weight of the polyurethane produced is determined by the proportion of the dihydric primary alcohol to the organic diisocyanate used in the initial reaction mixture. Although the preferred quantities to be used in the practice of this invention are those in which the isocyanato groups are present in stoichiometric equivalents to the active hydrogen atoms of the primary hydroxyl groups of the dihydric alcohol, in which case the molecular weight of the polyurethane obtained is the highest possible attainable molecular weight without incorporating the solvent, smaller quantities of the diisocyanate may be employed in which case polyurethanes with primary hydroxyl groups are obtained. In the latter instance, the reaction product also occurs in a finely divided form in the reaction medium and may be treated in a manner analogous to that already described herein with reference to the high molecular weight polyaddition products.

The polyurethanes obtained by the process of this invention are, therefore, in the form of stable dispersion which are particularly suitable for use as thickener pastes, and which are peculiarly compatible with textiles, and dyestuffs making them especially valuable as auxiliary agents therefor.

The invention is further illustrated but not limited by the following examples in which all parts are by weight unless otherwise specified.

Example 1

About 106 parts diethylene glycol are stirred into about 1000 parts of polypropylene glycol ether (OH number 58). After the addition of 0.2 cc. tin dibutyl dilaurate, about 174 parts toluylene diisocyanate are added with intensive stirring. The temperature rises to about 90° C. and polyurethane separates out after a few minutes. The reaction mixture is heated to about 120° C. for another 30 minutes. The emulsion obtained has an OH number of 59.

Example 2

About 119 parts of N-methyldiethanolamine are stirred into about 1000 parts of polypropylene glycol ether (OH number 56). About 174 parts of toluylene diisocyanate as defined in Example 1 are slowly added dropwise at room temperature, with thorough stirring. The temperature gradually rises to about 90° C., polyurethane separating out. The mixture is heated for another about 30 minutes at 110° C. to about 120° C. and an emulsion of OH number 55 is obtained.

Example 3

About 1000 parts of polypropylene glycol ether (OH number 56), about 90 parts butanediol-1,4, about 0.2 cc. tin dibutyl dilaurate and about 174 parts toluylene diisocyanate are reacted together under the conditions given in Example 1. The emulsion obtained has an OH number of 52.

Example 4

About 106 parts of diethylene glycol are stirred into about 1000 parts of polypropylene glycol ether (OH number 58). After the addition of 0.2 cc. tin dibutyl dilaurate, about 168 parts of hexamethylene diisocyanate are added dropwise at about 90° C. with vigorous stirring. The polyurethane obtained very soon separates out. To complete the reaction, the mixture is heated for another 30 minutes at about 120° C. The emulsion produced has an OH number of 59.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a stable dispersion of a polyurethane which comprises mixing together a di-(primary hydroxy) alcohol and a di(secondary hydroxy) alcohol and an organic diisocyanate in an amount up to the stoichiometric equivalent of said di(primary hydroxy) alcohol, whereby said di(primary hydroxy) alcohol reacts preferentially with the organic diisocyanate to form a polyurethane which precipitates from solution forming a dispersion in said di(secondary hydroxy) alcohol which does not settle out upon standing.

2. A method for making a stable dispersion of a polyurethane in a high molecular weight liquid polyhydric alcohol which comprises mixing and reacting up to about stoichiometric equivalents of a dihydric primary alcohol and an organic diisocyanate while the dihydric primary alcohol is dissolved in the said liquid polyhydric alcohol, said polyhydric alcohol having substantially exclusively secondary hydroxyl groups, a molecular weight of at least about 500, and an hydroxyl number of not more than about 225.

3. The process of claim 1 in which the organic diisocyanate is toluylene diisocyanate.

4. The process of claim 1 in which the organic compound having at least two substantially exclusively secondary hydroxyl groups is a polypropylene glycol ether having a molecular weight of at least about 500 and an hydroxyl number of about 56.

References Cited

UNITED STATES PATENTS

| | | | |
|---|---|---|---|
| 2,811,493 | 10/1957 | Simon et al. | 260—33.2 |
| 2,873,266 | 2/1959 | Urs | 260—77.4 |
| 2,937,151 | 5/1960 | Ten Broeck et al. | 260—33.2 |
| 3,123,577 | 3/1964 | Heiss | 260—34.2 |
| 3,216,973 | 11/1965 | Britain | 260—77.5 |
| 3,218,348 | 11/1965 | McElroy et al. | 260—77.5 |

MORRIS LIEBMAN, *Primary Examiner.*

B. AMERNICK, *Assistant Examiner.*